US009720246B2

(12) United States Patent
Won et al.

(10) Patent No.: US 9,720,246 B2
(45) Date of Patent: Aug. 1, 2017

(54) COMPLEX SPATIAL LIGHT MODULATOR AND 3D IMAGE DISPLAY INCLUDING THE SAME

(71) Applicants: SAMSUNG ELECTRONICS CO., LTD., Suwon-si (KR); Korea University Research and Business Foundation, Seoul (KR)

(72) Inventors: Kang-hee Won, Seoul (KR); Hwi Kim, Chungcheongnam-do (KR); Gee-young Sung, Daegu (KR); Hoon Song, Yongin-si (KR); Hong-seok Lee, Seongnam-si (KR); Su-jin Choi, Chungcheongnam-do (KR)

(73) Assignees: SAMSUNG ELECTRONICS CO., LTD., Suwon-si (KR); Korea University Research and Business Foundation, Seoul (KR)

( * ) Notice: Subject to any disclaimer, the term of this patent is extended or adjusted under 35 U.S.C. 154(b) by 144 days.

(21) Appl. No.: 14/109,131

(22) Filed: Dec. 17, 2013

(65) Prior Publication Data

US 2014/0340724 A1 Nov. 20, 2014

(30) Foreign Application Priority Data

May 16, 2013 (KR) .................... 10-2013-0056038

(51) Int. Cl.
G02B 5/32 (2006.01)
G02B 27/22 (2006.01)
G03H 1/22 (2006.01)

(52) U.S. Cl.
CPC .......... *G02B 27/2214* (2013.01); *G02B 5/32* (2013.01); *G03H 1/2205* (2013.01);
(Continued)

(58) Field of Classification Search
CPC ...... G02F 1/29; G02F 1/1335; G02F 2413/09; H04N 13/0282; H04N 13/0228;
(Continued)

(56) References Cited

U.S. PATENT DOCUMENTS 4,094,577 A * 6/1978 Spitz ..................... G02B 5/32
359/19
4,830,441 A * 5/1989 Chang ................... A61F 9/02
359/15

(Continued)

OTHER PUBLICATIONS

Arnab Sinha, George Barbastathis, Wenhau Liu, Demetri Psaltis. Imaging using volume holograms. Opt. Eng. 43(9) 1959-1972 (Sep. 2004).*

(Continued)

*Primary Examiner* — Bumsuk Won
*Assistant Examiner* — Collin X Beatty
(74) *Attorney, Agent, or Firm* — Sughrue Mion, PLLC

(57) ABSTRACT

A complex spatial light modulator for modulating a phase and amplitude of a light beam and a 3-dimensional (3D) display including the same are provided. The complex spatial light modulator includes a spatial light modulator modulating a phase of a light beam, a lenticular lens array disposed next to the spatial light modulator, and a volume holographic lens array spaced apart from the lenticular lens array and allowing light beams output from the lenticular lens array to be superimposed and to interfere with each other, and so that the phase and an amplitude of the light beam are simultaneously modulated.

10 Claims, 4 Drawing Sheets

(52) U.S. Cl.
CPC ..... *G03H 1/2294* (2013.01); *G03H 2001/221* (2013.01); *G03H 2223/17* (2013.01); *G03H 2223/19* (2013.01); *G03H 2225/33* (2013.01); *G03H 2225/55* (2013.01)

(58) Field of Classification Search
CPC .......... H04N 13/0409; H04N 13/0404; G02B 3/0006; G02B 3/0056; G02B 5/32; G02B 27/2214; G03H 2001/303; G03H 2001/2239; G03H 2001/0224; G03H 1/0248; G03H 1/2294; G03H 1/2205; G03H 2225/22; G03H 2225/33; G03H 2225/55; G03H 2223/19; G03H 2223/17
USPC ......... 359/9, 11, 15, 32, 238, 290, 291, 462, 359/463, 389.08, 19, 20, 24, 619, 489.08; 348/51, E13.029
See application file for complete search history.

(56) References Cited

U.S. PATENT DOCUMENTS

| | | | |
|---|---|---|---|
| 5,587,815 A | 12/1996 | Sato et al. | |
| 7,944,465 B2* | 5/2011 | Goulanian et al. | 348/51 |
| 2006/0050340 A1* | 3/2006 | Schwerdtner et al. | 359/15 |
| 2006/0109200 A1* | 5/2006 | Alden | 345/8 |
| 2007/0035829 A1* | 2/2007 | Woodgate et al. | 359/462 |
| 2007/0070476 A1* | 3/2007 | Yamada et al. | 359/9 |
| 2007/0183033 A1* | 8/2007 | Schwerdtner | 359/463 |
| 2009/0207466 A1* | 8/2009 | Bucklay | 359/9 |
| 2010/0046050 A1 | 2/2010 | Kroll et al. | |
| 2010/0103486 A1* | 4/2010 | Kroll et al. | 359/9 |
| 2010/0118359 A1* | 5/2010 | Leister | 359/9 |
| 2010/0232000 A1* | 9/2010 | Futterer et al. | 359/9 |
| 2010/0265558 A1* | 10/2010 | Leister et al. | 359/246 |
| 2010/0277779 A1* | 11/2010 | Futterer et al. | 359/9 |
| 2012/0092735 A1* | 4/2012 | Futterer et al. | 359/11 |
| 2012/0162732 A1 | 6/2012 | Hong et al. | |
| 2013/0222384 A1* | 8/2013 | Futterer | 345/426 |
| 2014/0300709 A1* | 10/2014 | Futterer et al. | 348/51 |

OTHER PUBLICATIONS

Philip M. Birch, Rupert Young, David Budgett, and Chris Chatwin. Two-pixel computer-generated hologram with a zero-twist nematic liquid-crystal spatial light modulator. Jul. 15, 2000 / vol. 25, No. 14 / Optics Letters.*
H. Takahashi, H. Fujinami, K. Yamada. Holographic lens array increases the viewing angle of 3D displays. SPIE 2006.*
Stephan Reichelt, Ralf Häussler, Norbert Leister, Gerald Fütterer, Hagen Stolle, and Armin Schwerdtner. Holographic 3-D Displays—Electro-holography within the Grasp of Commercialization. Advances in Lasers and Electro Optics, Book edited by: Nelson Costa and Adolfo Cartaxo, ISBN 978-953-307-088-9, pp. 838, Apr. 2010, INTECH, Croatia.*
C. B. Burckhardt. A Simplification of Lee's Method of Generating Holograms by Computer. Bell Telephone Laboratories, Murray Hill, New Jersey 07974. Received May 18, 1970. Applied Optics, vol. 9, No. 8, Aug. 1970.*
Theresa A. Maldonado. Electro-Optic Modulators, Chpt. 13 in Handbook of Optics, 3rd Ed. 2010.*

* cited by examiner

COMPLEX SPATIAL LIGHT MODULATOR AND 3D IMAGE DISPLAY INCLUDING THE SAME

CROSS-REFERENCE TO RELATED APPLICATION

This application claims the benefit of Korean Patent Application No. 10-2013-0056038, filed on May 16, 2013, in the Korean Intellectual Property Office, the disclosure of which is incorporated herein in its entirety by reference.

BACKGROUND

1. Field

Apparatuses consistent with exemplary embodiments relate to complex spatial light modulators for modulating a phase and amplitude of a light beam and three-dimensional (3D) displays including the same.

2. Description of the Related Art

Recently, as 3D movies have been released on the market, technologies related to 3D image displays have been intensively researched. Currently commercialized 3D image displays use binocular parallax to display a 3D image. That is, an image for the left eye and an image for the right-eye having different viewpoints are respectively provided to the left eye and the right eye of a viewer so that the viewer can perceive a 3D effect. 3D image displays are classified into glasses-type 3D image displays that require the use of 3D glasses and glasses-free 3D image displays that do not require use of 3D glasses.

However, when a 3D image is displayed according to a binocular parallax scheme, considerable eyestrain is caused since a 3D image display provides only a limited natural 3D effect as only two viewpoints of a left-eye image and a right-eye image do not reflect a viewpoint change according to a movement of a viewer.

Thus, in order to display a natural 3D image, a holographic 3D image display has been investigated. However, in order to implement a holographic 3D image display, elements capable of controlling a phase as well as an amplitude of a light beam are necessary. When an image is displayed by using an element controlling only one of the brightness (amplitude) and the phase, image quality may be degraded due to a zero-order diffraction light beam, twin images, speckles etc.

SUMMARY

One or more exemplary embodiments may provide complex spatial light modulators capable of controlling both the amplitude and phase of a light beam.

One or more exemplary embodiments may provide holographic 3-dimensional (3D) image displays displaying 3D images by employing the above complex spatial light modulators.

Additional exemplary aspects and advantages will be set forth in part in the description which follows and, in part, will be apparent from the description, or may be learned by practice of the presented embodiments.

According to an aspect of an exemplary embodiment, a complex spatial light modulator includes: a spatial light modulator which modulates a phase of a light beam incident thereon; a lenticular lens array disposed such that light transmitted by the spatial light modulator is incident thereon; and a volume holographic lens array spaced apart from the lenticular lens array, which superimposes light beams incident thereon such that they interfere.

The volume holographic lens array may have a focal length twice that of the lenticular lens array.

A distance between the volume holographic lens array and an image plane on which the light beam from the volume holographic lens array forms an image may be twice that between the lenticular lens array and the volume holographic lens array.

A distance between the lenticular lens array and the volume holographic lens array may be three halves times a focal length of the volume holographic lens array, and a distance between the volume holographic lens array and an image plane on which the light beam from the volume holographic lens array forms an image may be three times a focal length of the volume holographic lens array.

A width of one lens cell of the lenticular lens array may be equal to that of two pixels of the spatial light modulator.

An image light beam from one pixel in the spatial light modulator may be enlarged twice to form an image on an image plane.

The volume holographic lens array may have a holographic pattern structure including a plurality of lenses arrayed in an overlapping manner.

Two light beams passing through the volume holographic lens array may be combined on a same light axis such that amplitudes and phases thereof are modulated.

The spatial light modulator may include a liquid crystal layer.

According to an aspect of another exemplary embodiment, 3-dimensional (3D) image display includes: an optical source unit for emitting a light beam; a spatial light modulator which modulates a phase of the light beam incident thereon; and a beam combiner which modulates a phase and an amplitude of a light beam from the spatial light modulator, wherein the beam combiner comprises a lenticular lens array disposed such that light transmitted by the spatial light modulator is incident thereon and a volume holographic lens array which superimposes light beams incident thereon such that they interfere.

BRIEF DESCRIPTION OF THE DRAWINGS

These and/or other exemplary aspects and advantages will become apparent and more readily appreciated from the following description of the embodiments, taken in conjunction with the accompanying drawings in which.

DETAILED DESCRIPTION

Figure 1:
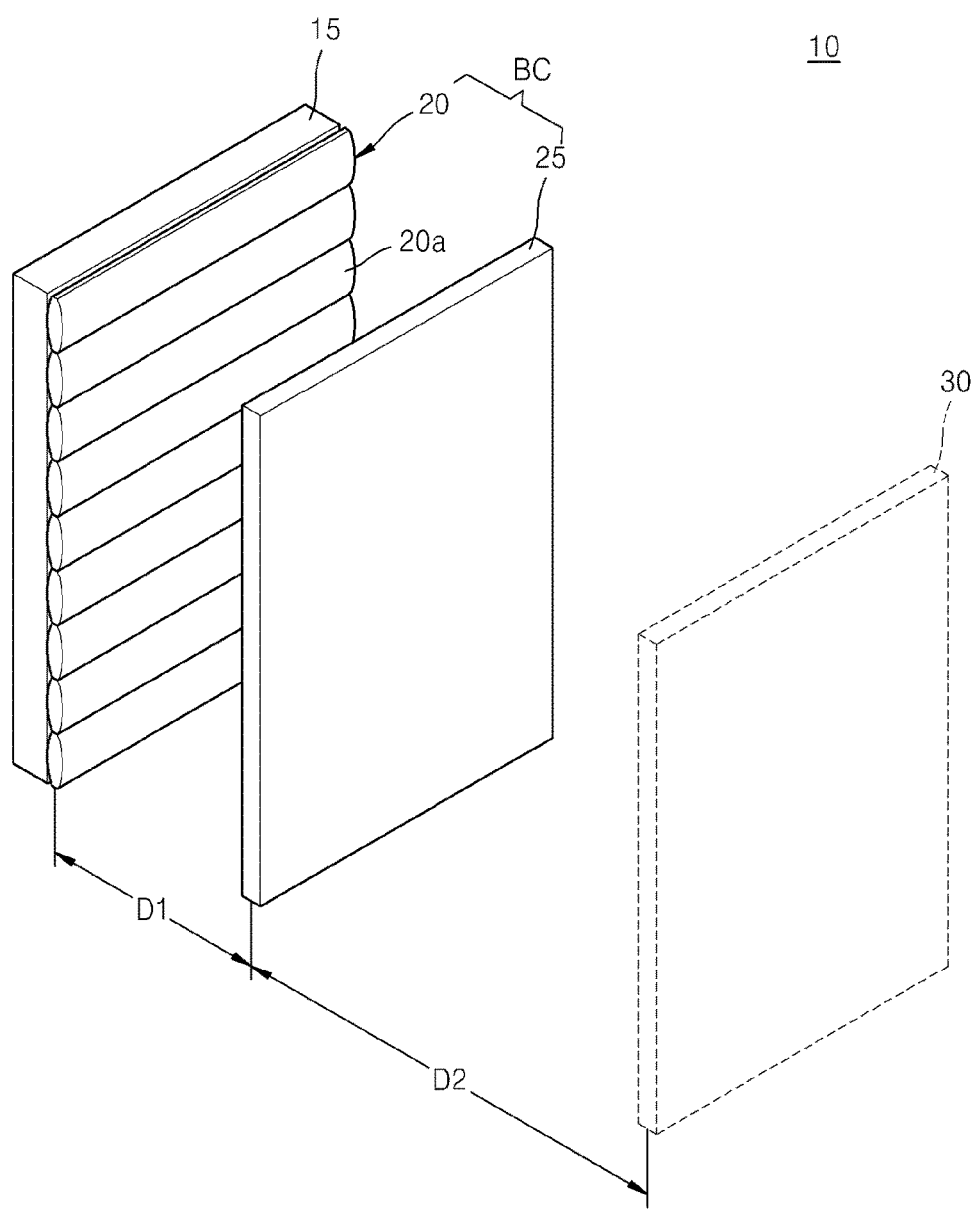
FIG. 1 schematically illustrates a complex spatial light modulator according to an exemplary embodiment.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. In the accompanying drawings, the sizes and thicknesses of elements may be exaggerated for description's convenience.

FIG. 1 schematically illustrates a complex spatial light modulator 10 according to an exemplary embodiment. The complex spatial light modulator 10 may include a spatial light modulator 15 for phase-modulation of a light beam and a beam combiner BC combining light beams output from the spatial light modulator 15. The beam combiner BC may include a lenticular lens array 20 and a volume holographic lens array 25.

The spatial light modulator 15 may include a photoelectric device having a refractive index which changes in response to an electrical signal applied thereto. The spatial light modulator 15 may include, for example, a photoelectric material layer such as a liquid crystal layer. The spatial light modulator 15 may control a phase of a light beam which is output based on the voltage-induced change in the refractive index. For example, the spatial light modulator 15 may include a polymer dispersion liquid crystal layer. A light-path length may be changed and a phase of a light beam may be modulated according to a voltage applied to the polymer dispersion liquid crystal layer. Furthermore, according to the characteristics of the photoelectric material layer, phase retardation may occur and a polarization direction of the transmitted light may be changed. Although not shown in the drawing, a phase plate or a polarization plate may be further included next to the spatial light modulator 15 for correcting the changed polarization direction.

Figure 2:
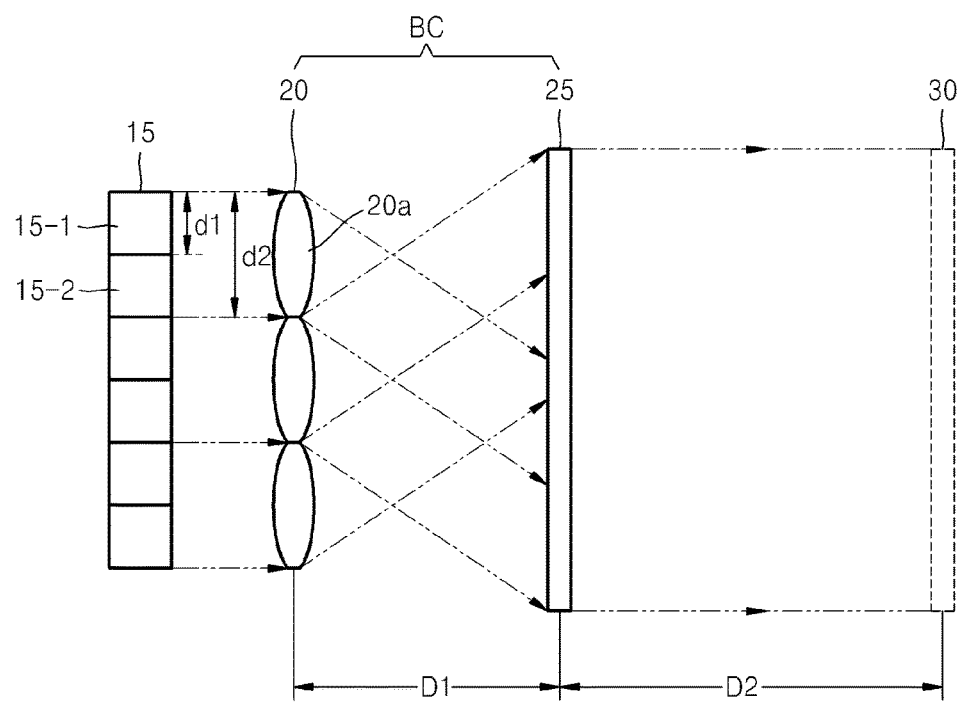
FIG. 2 is a front view of a complex spatial light modulator according to an exemplary embodiment.

Referring to FIG. 2, the spatial light modulator 15 may include a plurality of pixels. The plurality of pixels may be arrayed, for example, in a 2-dimensional matrix form. The plurality of pixels may include, for example, a first pixel 15-1 and a second pixel 15-2.

The lenticular lens array 20 may include a plurality of lens cells 20a arrayed in a longitudinal direction. Also, for example, a single lens cell 20a may have a width corresponding to two pixels 15-1 and 15-2. In other words, a width d2 of a single lens cell 20a is twice a width d1 of a single pixel. The width refers to a width in a longitudinal direction, as shown in FIG. 2. Also, a lens cell 20a may be disposed to correspond to and face two rows of pixels. As shown in FIG. 2, the lens cell 20a may be disposed to face the first and second pixels 15-1 and 15-2.

The spatial light modulator 15 and the lenticular lens array 20 may be spaced apart from each other. Alternatively, the lenticular lens array 20 may be attached to the spatial light modulator 15. The volume holographic lens array 25 may be spaced apart from the lenticular lens array 20.

Figure 3:
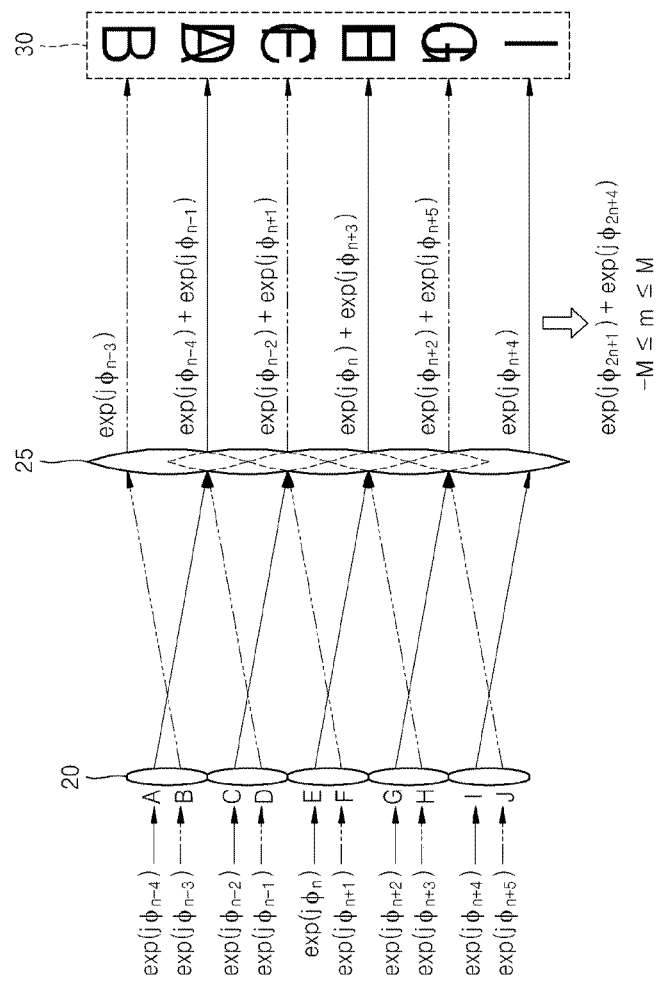
FIG. 3 illustrates an operation of a complex spatial light modulator according to an exemplary embodiment.

The volume holographic lens array 25 may have a focal length twice that of the lenticular lens array 20. As shown in FIG. 3, the volume holographic lens array 25 may have a holographic pattern structure in which a plurality of lens array patterns are spatially overlapped according to the volume hologram principle. That is, the volume holographic lens array 25 may allow the plurality of lens array patterns to be spatially overlapped and recorded. The volume holographic lens array 25 is schematically shown in FIG. 3. The volume holographic lens array 25 may perform a function of selectively transmitting only an optical wave of an input plane, which is coincident with the center of any lens from among a plurality of lens array holographic patterns, to an output plane. Namely, an optical wave, which is coincident with a lens center of any one lens array holographic pattern, from among optical waves incident on the volume holographic lens array 25 is selectively output to form an image on an image plane 30. Accordingly, the volume holographic lens array 25 may spatially and independently overlap and enlarge each pixel image output from the spatial light modulator 15 according to the holographic principle without any disturbance due to optical waves. In addition, the volume holographic lens array 25 may superimpose light beams passing through the spatial light modulator 15 and the lenticular lens array 20 and allow them to be interfered.

A light beam passing through the volume holographic lens array 25 may form an image on the surface 30. A distance D2 between the volume holographic lens array 25 and the image plane 30 may be twice a distance D1 between the lenticular lens array 20 and the volume holographic lens array 25. When D2=2D1, an image formed by the light beam passing through the volume holographic lens array 25 may be enlarged on the image plane 30.

For example, the distance D1 between the lenticular lens array 20 and the volume holographic lens array 25 may be three halves times a focal length fc of the volume holographic lens array 25, and the distance D2 between the volume holographic lens array 25 and the image plane 30 may be three times a focal length fc of the volume holographic lens array 25.

An operation of the complex spatial light modulator according to an exemplary embodiment is described with reference to FIG. 3.

In the spatial light modulator 15, a phase and an amplitude of a light beam may be modulated by allowing the first and second pixels 15-1 and 15-2 to form a pair and allowing a first light beam passing through the first pixel 15-1 and a second light beam passing through the second pixel 15-2 to be combined by the beam combiner BC.

The spatial light modulator 15 may modulate a phase of an incident light beam. For example, the first light beam incident on the first pixel 15-1 may be modulated to have a first phase ϕ1 and the second light beam incident on the second pixel 15-2 may be modulated to have a second phase ϕ2. Also, the first and second light beams combined by the beam combiner BC may satisfy the following equation:

$$\frac{1}{2}e^{i\phi_1(x,y)} + \frac{1}{2}e^{i\phi_2(x,y)} = \cos\left(\frac{\phi_1 - \phi_2}{2}\right)\exp\left[i\left(\frac{\phi_1 + \phi_2}{2}\right)\right] \quad (1)$$

In the right side of equation 1, "cos" relates to amplitude, and "exp" relates to phase. Equation 1 shows that the phase and the amplitude may be simultaneously modulated, when the first light beam having the first phase ϕ1 and the second light beam having the second phase ϕ2 are combined. In the complex spatial light modulator 10 as shown in FIG. 1, the light beams may be combined into a light beam having a single light axis by the lenticular lens array 20 and the volume holographic lens arrays 25.

In detail, as shown in FIG. 3, a (n−4)-th light having a phase (ϕn−4), a (n−3)-th light having a phase (ϕn−3), a (n−2)-th light having a phase (ϕn−2), a (n−1)-th light having a phase (ϕn−1), a n-th light having a phase ϕn, a (n+1)-th light having a phase (ϕn+1), a (n+2)-th light having a phase (ϕn+2), a (n+3)-th light having a phase (ϕn+3), a (n+4)-th light having a phase (ϕn+4), and a (n+5)-th light having a phase (ϕn+5) may be incident on the lenticular lens array 20. An image light beam passing through the lenticular lens array 20 may be enlarged and overlapped, and be incident on the volume holographic lens array 25. Also, the above-described light beams may be interfered by the volume holographic lens array 25 and amplitudes and phases thereof may be modulated as showing by the following equation.

$$\exp(i\phi n-4)+\exp(i\phi n-1)=2\cos[\{(\phi n-4)-(\phi n-1)\}/2]$$
$$\exp[i\{(\phi n-4)+(\phi n-1)\}/2]$$

$$\exp(i\phi n-2)+\exp(i\phi n+1)=2\cos[\{(\phi n-2)-(\phi n+1)\}/2]$$
$$\exp[i\{(\phi n-2)+(\phi n+1)\}/2]$$

$$\exp(i\phi n)+\exp(i\phi n+3)=2\cos[\{(\phi n3)-(\phi n+3)\}/2]\exp[i\{(\phi n)+(\phi n+3)\}/2]$$

$$\exp(i\phi n+2)+\exp(i\phi n+5)=2\cos[\{(\phi n+2)-(\phi n+5)\}/2]$$
$$\exp[i\{(\phi n+2)+(\phi n+5)\}/2]$$

$$\exp(i\phi 2n+1)+\exp(i\phi 2n+4)=2\cos[\{(\phi 2n+1)-(\phi 2n+4)\}/2]\exp[i\{(\phi 2n+1)+(\phi 2n+4)\}/2] \quad (2)$$

In FIG. 3, the light beam having a phase ($\phi$n−3) at the top of the figure and the light beam having a phase ($\phi$n+4) at the bottom of the figure may become invalid beams that do not overlap with other light beams.

For the convenience of description, it is assumed that the (n−4)-th light beam having the phase ($\phi$n−4) represents an image A, the (n−3)-th light beam having the phase ($\phi$n−3) represents an image B, the (n−2)-th light beam having the phase ($\phi$n−2) represents an image C, the (n−1)-th light beam having the phase ($\phi$n−1) represents an image D, the n-th light beam having the phase $\phi$n represents and image E, the (n+1)-th light beam having the phase ($\phi$n+1) represents an image F, the (n+2)-th light beam having the phase ($\phi$n+2) represents an image G, the (n+3)-th light beam having the phase ($\phi$n+3) represents an image H, the (n+4)-th light beam having the phase of ($\phi$n+4) represents an image I, and the (n+5)-th light beam having the phase ($\phi$n+5) represents an image J. Through the lenticular lens array 20 and the volume holographic lens array 25, the A and D images are enlarged and overlapped, the C and F images are enlarged and overlapped, the E and H images are enlarged and overlapped, and the G and J images are enlarged and overlapped. In this embodiment, the images B and I do not overlap with other images and become invalid.

In the exemplary embodiments as described above, a phase of a light beam is modulated by the spatial light modulator 15, and a phase and an amplitude of a light beam may be simultaneously modulated by the beam combiner BC. Accordingly, the quality of an image may be prevented from being degraded due to twin images and speckles. Also, since the spatial light modulator 15 and the beam combiner BC are arranged in parallel, the optical arrangement thereof is easy. In addition, since the spatial light modulator 15 and the beam combiner BC may be have small thickness, the complex spatial light modulator 10 may be also have a small thickness. Accordingly, the complex spatial light modulator 15 may be applied to, for example, a flat panel display (FPD).

The complex spatial light modulator 15 according to an exemplary embodiment may be also applied to a holographic 3D image display to display a realistic 3D image.

Figure 4:
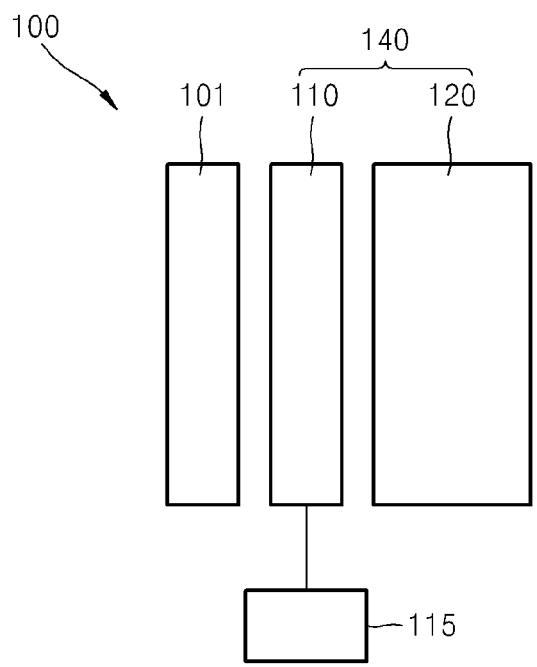
FIG. 4 schematically illustrates a 3-dimensional (3D) image display according to an exemplary embodiment.

FIG. 4 schematically illustrates a 3D image display 100 according to an exemplary embodiment.

The 3D image display 100 may include an optical source unit 101 emitting a light beam, and a complex spatial light modulator 140 displaying a 3D image by using the light beam emitted from the optical source unit 101. The optical source unit 101 may include an optical source, for example, a cold cathode fluorescent lamp (CCFL) or an LED. The optical source unit 101 may be of a direct type so that the light beam is directly transmitted to the complex spatial light modulator 140 or of a side type so that the light beam is provided from a side of the complex spatial light modulator 140 through an optical waveguide.

The complex spatial light modulator 140 may include a spatial light modulator 110 for modulating a phase, and a beam combiner 120 for modulating a phase and an amplitude of a light beam by combining the light beams from the spatial light modulator 110. Also, the spatial light modulator 140 may include an image signal circuit unit 115 for inputting a holographic image signal to the spatial light modulator 140. The complex spatial light modulator 140 may have the same structure as the complex spatial light modulator 10 of FIGS. 1 to 3. The complex spatial light modulator 140 may have a small thickness, and employed in a flat panel type holographic 3D image display to provide a high quality 3D image.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. A complex spatial light modulator comprising:
a spatial light modulator which modulates a phase of a light beam transmitted therethrough;
a lenticular lens array disposed such that light transmitted by the spatial light modulator is incident thereon; and
a volume holographic lens array, spaced apart from the lenticular lens array, which superimposes light beams incident thereon such that the light beams interfere;
wherein the spatial light modulator comprises a liquid crystal layer,
wherein the volume holographic lens array has a holographic pattern structure comprising a plurality of lenses arrayed in a plurality of lens array holographic patterns which are spatially overlapped,
wherein the plurality of lenses are arranged such that the transmitted optical waves are combined on a same optical axis, thereby modulating both an amplitude and a phase of the light beam; and
wherein a focal length of the volume holographic lens array is twice as long as a focal length of the lenticular lens array.

2. The complex spatial light modulator of claim 1, wherein a distance between the volume holographic lens array and an image plane on which a light beam transmitted by the volume holographic lens array forms an image is twice as long as a distance between the lenticular lens array and the volume holographic lens array.

3. The complex spatial light modulator of claim 1, wherein a distance between the lenticular lens array and the volume holographic lens array is three halves as long as a focal length of the volume holographic lens array, and a distance between the volume holographic lens array and an image plane on which a light beam transmitted by the volume holographic lens array forms an image is three times as long as a focal length of the volume holographic lens array.

4. The complex spatial light modulator of claim 1, wherein a width of one lens cell of the lenticular lens array is equal to a width of two pixels of the spatial light modulator.

5. The complex spatial light modulator of claim 1, wherein an image light beam output from one pixel in the spatial light modulator is enlarged twice to form an image on an image plane.

6. A three-dimensional (3D) image display comprising:
an optical source unit which emits emitting a light beam;

a spatial light modulator which modulates a phase of the light beam transmitted therethrough; and a beam combiner which modulates a phase and an amplitude of the light beam transmitted by the spatial light modulator, wherein the beam combiner comprises a lenticular lens array, disposed such that light transmitted by the spatial light modulator is incident thereon, and a volume holographic lens array which superimposes light beams incident thereon such that the light beams interfere;

wherein the spatial light modulator comprises a liquid crystal layer, wherein the volume hologram lens array has a holographic pattern structure comprising a plurality of lenses arrayed in a plurality of lens array holographic patterns which are spatially overlapped, wherein the plurality of lenses are arranged such that the transmitted optical waves are combined on a same optical axis, thereby modulating both an amplitude and a phase of the light beam; and wherein a focal length of the volume holographic lens array is twice as along as a focal length of the lenticular lens array.

7. The 3D image display of claim 6, wherein a distance between the volume holographic lens array and an image plane on which a light beam transmitted by the volume holographic lens array forms an image is twice as long as a distance between the lenticular lens array and the volume holographic lens array.

8. The 3D image display of claim 6, wherein a distance between the lenticular lens array and the volume holographic lens array is three halves as long as a focal length of the volume holographic lens array, and a distance between the volume holographic lens array and an image plane on which a light beam transmitted by the volume holographic lens array forms an image is three times as long as a focal length of the volume holographic lens array.

9. The 3D image display of claim 6, wherein a width of one lens cell of the lenticular lens array is equal to a width of two pixels of the spatial light modulator.

10. The 3D image display of claim 6, wherein an image light beam output from one pixel from the spatial light modulator is enlarged twice to form an image on an image plane.

* * * * *